US012786031B2

(12) United States Patent
Sahraei et al.

(10) Patent No.: US 12,786,031 B2
(45) Date of Patent: Nov. 3, 2026

(54) TECHNIQUES FOR NUMEROLOGY ADAPTATION IN THE PRESENCE OF PASSIVE MULTIPLE-INPUT AND MULTIPLE-OUTPUT (P-MIMO)

(71) Applicant: QUALCOMM Incorporated, San Diego, CA (US)

(72) Inventors: Saeid Sahraei, San Diego, CA (US); Hung Dinh Ly, San Diego, CA (US); Yu Zhang, San Diego, CA (US); Hwan Joon Kwon, San Diego, CA (US); Krishna Kiran Mukkavilli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 226 days.

(21) Appl. No.: 18/572,035

(22) PCT Filed: Aug. 26, 2021

(86) PCT No.: PCT/CN2021/114747

§ 371 (c)(1),
(2) Date: Dec. 19, 2023

(87) PCT Pub. No.: WO2023/024020

PCT Pub. Date: Mar. 2, 2023

(65) Prior Publication Data

US 2025/0286767 A1 Sep. 11, 2025

(51) Int. Cl.

*H04L 27/26* (2006.01)
*H04B 7/026* (2017.01)

(Continued)

(52) U.S. Cl.

CPC ......... *H04L 27/2646* (2013.01); *H04B 7/026* (2013.01); *H04B 7/04013* (2023.05);

(Continued)

(58) Field of Classification Search

CPC ............. H04L 27/2646; H04L 25/0216; H04L 27/2607; H04L 27/26025; H04B 7/026;

(Continued)

(56) References Cited

U.S. PATENT DOCUMENTS

2012/0281551 A1* 11/2012 Alanara .............. H04L 27/2607 370/252
2017/0085342 A1* 3/2017 Muharemovic ....... H04W 72/56

(Continued)

FOREIGN PATENT DOCUMENTS

CN 104320366 A 1/2015
WO 2019125234 A1 6/2019

OTHER PUBLICATIONS

Gao X., et al., "An Efficient OFDM with Adaptive Guard Interval for Amplify and Forward Relay Systems", 2013 IEEE 78th Vehicular Technology Conference (VTC FALL), IEEE, Sep. 2, 2013, 5 pages, XP032548489, Sections I. to III.

(Continued)

*Primary Examiner* — Michael A Keller
*Assistant Examiner* — Chhian (Amy) Ling
(74) *Attorney, Agent, or Firm* — ArentFox Schiff, LLP

(57) ABSTRACT

The present disclosure relates to numerology adaptation in the presence of passive multiple-input and multiple-output (P-MIMO) communications. In one implementation, a UE may identify a delay spread of a communication channel associated with a reconfigurable intelligent surface (RIS) deployment. The UE may further transmit, to a network entity, a measurement report including the delay spread of the communication channel. The UE may further receive, from the network entity, an indication associated with a cyclic prefix (CP) length. In another implementation, a network entity may receive, from a UE, a measurement report including a delay spread of a communication channel.

(Continued)

The network entity may further identify a CP length associated with a RIS deployment on the communication channel. The network entity may further transmit, to the UE, an indication associated with the CP length.

24 Claims, 10 Drawing Sheets

(51) Int. Cl.

| | |
|---|---|
| ***H04B 7/04*** | (2017.01) |
| ***H04L 25/02*** | (2006.01) |
| ***H04W 24/10*** | (2009.01) |
| *H04B 7/06* | (2006.01) |
| *H04B 7/155* | (2006.01) |

(52) U.S. Cl.
CPC ...... *H04L 25/0216* (2013.01); *H04L 27/2607* (2013.01); *H04W 24/10* (2013.01); *H04B 7/0617* (2013.01); *H04B 7/15507* (2013.01); *H04B 7/15528* (2013.01); *H04L 27/26025* (2021.01)

(58) Field of Classification Search
CPC .............. H04B 7/04013; H04B 7/0617; H04B 7/15507; H04B 7/15528; H04W 24/10
See application file for complete search history.

(56) References Cited

U.S. PATENT DOCUMENTS

| | | | | |
|---|---|---|---|---|
| 2017/0127411 | A1 | 5/2017 | Miao et al. | |
| 2018/0062801 | A1 | 3/2018 | Zhang et al. | |
| 2020/0336348 | A1 | 10/2020 | Razavi et al. | |
| 2023/0170969 | A1 * | 6/2023 | Kim | H04L 1/0057 375/267 |
| 2023/0328704 | A1 | 10/2023 | Oh et al. | |
| 2023/0370931 | A1 * | 11/2023 | Wang | H04W 36/30 |
| 2025/0106082 | A1 * | 3/2025 | Kim | H04L 27/2613 |

OTHER PUBLICATIONS

Supplementary European Search Report—EP21954551—Search Authority—Berlin—Apr. 3, 2025.

International Search Report and Written Opinion—PCT/CN2021/114747—ISA/EPO—Mar. 28, 2022.

Qualcomm Incorporated “CP Configuration for D2D”, 3GPP TSG-RAN WG1 #78bis, R1-143983, Oct. 10, 2014 (Oct. 10, 2014), 2 Pages, The Whole Document.

* cited by examiner

430

450

TECHNIQUES FOR NUMEROLOGY ADAPTATION IN THE PRESENCE OF PASSIVE MULTIPLE-INPUT AND MULTIPLE-OUTPUT (P-MIMO)

TECHNICAL FIELD

Aspects of the present disclosure relate generally to wireless communication systems, and more particularly, to numerology adaptation in the presence of passive multiple-input and multiple-output (P-MIMO) communications.

DESCRIPTION OF THE RELATED TECHNOLOGY

Wireless communication systems are widely deployed to provide various types of communication content such as voice, video, packet data, messaging, broadcast, and so on. These systems may be multiple-access systems capable of supporting communication with multiple users by sharing the available system resources (such as time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In some aspects, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications (mMTC), which can allow a very large number of connected devices and transmission of a relatively low volume of non-delay-sensitive information.

For example, for various communications technology such as, but not limited to NR, some implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE) including receiving, identifying a delay spread of a communication channel associated with a reconfigurable intelligent surface (RIS) deployment. The method further includes transmitting, to a network entity, a measurement report including the delay spread of the communication channel. The method further includes receiving, from the network entity, an indication associated with a cyclic prefix (CP) length.

Another example implementation includes a method of wireless communication at a network entity including receiving, from a UE, a measurement report including a delay spread of a communication channel. The method further includes identifying a CP length associated with an RIS deployment on the communication channel. The method may further include transmitting, to the UE, an indication associated with the CP length.

In a further example, an apparatus for wireless communication is provided that includes a transceiver, a memory configured to store instructions, and one or more processors communicatively coupled with the transceiver and the memory. The one or more processors are configured to execute the instructions to perform the operations of the methods described herein. In another aspect, an apparatus for wireless communication is provided that includes means for performing the operations of methods described herein. In yet another aspect, a non-transitory computer-readable medium is provided including code executable by one or more processors to perform the operations of the methods described herein. The apparatus may be a UE or a network entity.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Like reference numbers and designations in the various drawings indicate like elements.

Figure 1:
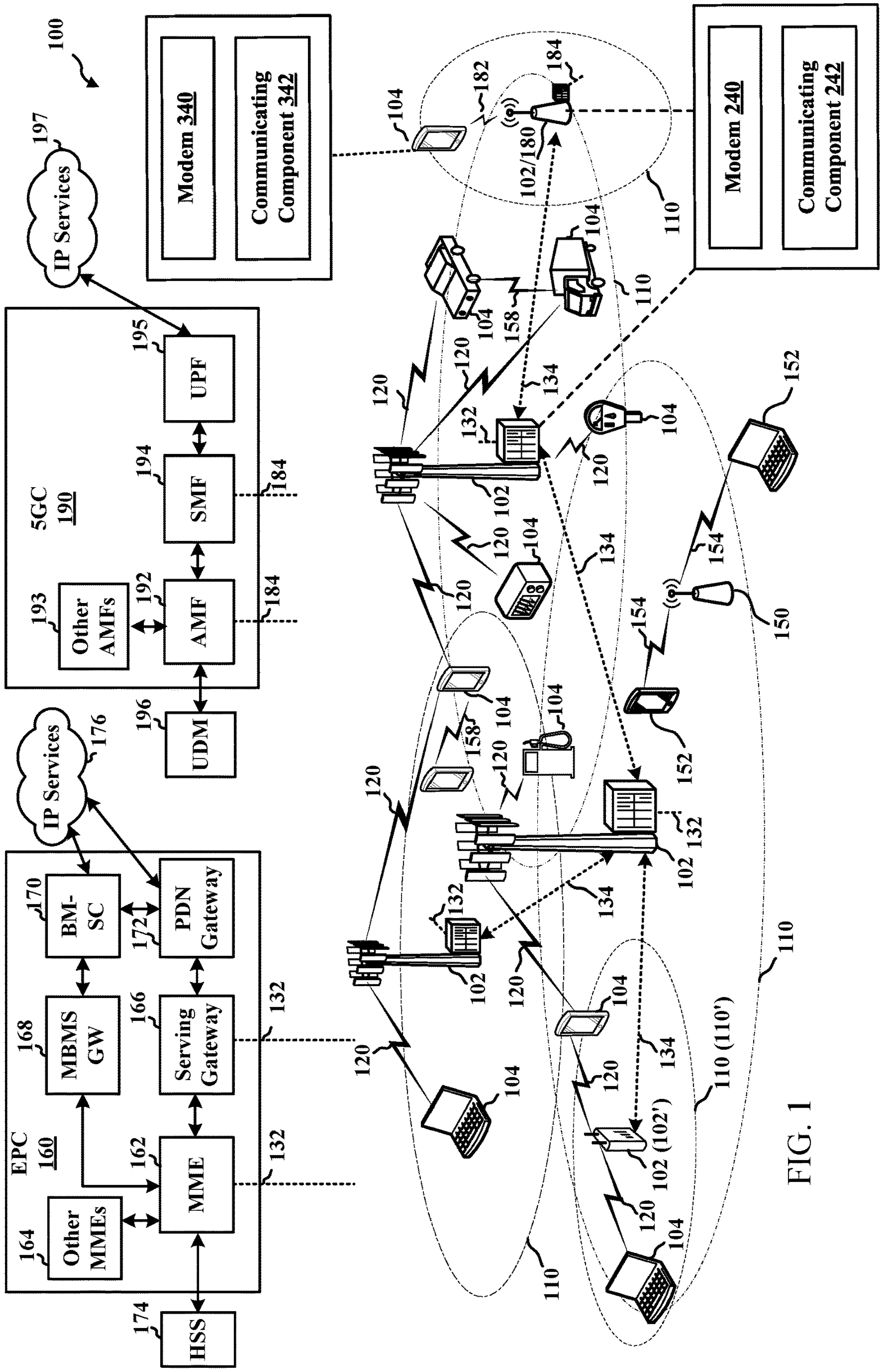
FIG. 1 illustrates an example of a wireless communication system.

An Appendix is included that is part of the present application and provides additional details related to the various aspects of the present disclosure.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to numerology adaptation in the presence of passive multiple-input and multiple-output (P-MIMO) communications. In some implementation, P-MIMO may also be referred to reconfigurable intelligent surface (RIS). A RIS can shape radio propagation by passively reflecting the impinging electromagnetic waves.

MIMO systems may employ a combination of antenna expansion and complex processes. Typically, both user equipments (UEs) and networks may have multiple antennas to enhance connectivity and provide improved speeds and user experiences. MIMO procedures come into play to control how data maps into antennas and where to focus energy in space. Both network and mobile devices may coordinate among each other to make MIMO work.

In some wireless communication systems, Massive MIMO, which may be an extension of MIMO, expands beyond previous systems by adding a much higher number of antennas on the base station. The massive number of antennas helps focus energy, which brings drastic improvements in throughput and efficiency. Along with the increased number of antennas, both the network and UEs implement more complex designs to coordinate MIMO operations. As such, massive MIMO may aim to achieve performance improvements to underpin the 5G user experiences.

However, as the path distance increases, and the directional complexity of the transmission increase as a result of RIS deployment, the delay spread may correspondingly increase. For example, paths which are very long due to their poor pathloss may typically be excluded from communications. These very type of long paths may be responsible for causing larger delays, and hence delay spread. Unfortunately, this equilibrium breaks when RIS is deployed. The beam-forming gain of RIS can overcome the large pathloss, and may result in paths which have a large delay but comparable pathloss to other shorter paths. This may result in an increased delay spread. That is, communication paths via RIS deployments may extend 5G coverage, but may also increase the delay spread, i.e., a measure of the multipath profile of a mobile communications channel. The present disclosure mitigates the increase in delay spread by supporting flexible cyclic prefix (CP) adaptation.

Particular implementations of the subject matter described in this disclosure can be implemented to realize one or more of the following potential advantages. The present aspects set forth techniques for improving coverage of New Radio (NR) cells. Specifically, implementing flexible CP adaptation may improve RIS deployments, improving coverage and spectrum efficiency.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, or a computer. By way of illustration, both an application running on a computing device and the computing device can be a component. One or more components can reside within a process or thread of execution and a component can be localized on one computer or distributed between two or more computers. In addition, these components can execute from various computer readable media having various data structures stored thereon. The components can communicate by way of local or remote processes such as in accordance with a signal having one or more data packets, such as data from one component interacting with another component in a local system, distributed system, or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (such as LTE) communications over a shared radio frequency spectrum band. The description below, however, describes an LTE/LTE-A system for purposes of example, and LTE terminology is used in much of the description below, although the techniques are applicable beyond LTE/LTE-A applications (such as to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. or may not include all of the devices, components, modules etc. discussed in connection with the figures. A combination of these approaches also can be used.

FIG. 1 illustrates an example of a wireless communication system. The wireless communications system (also referred to as a wireless wide area network (WWAN)), includes an access network 100, base stations 102, UEs 104, an Evolved Packet Core (EPC) 160, or a 5G Core (5GC) 190. The base stations 102, which also may be referred to as network entities, may include macro cells (high power cellular base station) or small cells wow power cellular base station). The macro cells can include base stations. The small cells can include femtocells, picocells, and microcells. In an example, the base stations 102 also may include gNBs 180, as described further herein.

In one example, some nodes such as base station 102/gNB 180, may have a modem 240 and communicating component 242 for receiving, from a UE 104, a measurement report including a delay spread of a communication channel, identifying a CP length associated with a reconfigurable intelligent surface (RIS) deployment on the communication channel, and transmitting, to the UE 104, an indication associated with the CP length, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for identifying a delay spread of a communication channel associated with a RIS deployment, transmitting, to a network entity, a measurement report including the delay spread of the communication channel, and receiving, from the network entity, an indication associated with a CP length, as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (such as using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as using an X2 interface). The backhaul links 132, 134 or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network also may include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (such as for x component carriers) used for transmission in the DL or the UL direction. The carriers may or may not be adjacent to each other. Allocation of carriers may be asymmetric with respect to DL and UL (such as more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an ENB, gNodeB (gNB), or other type of base station. Some base stations, such as gNB 180 may operate in a traditional sub 6 GHz spectrum, in millimeter wave (mmW) frequencies, or near mmW frequencies in communication with the UE 104.

When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, which may correspond to gNB 180, may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (such as from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (such as satellite, terrestrial), a multimedia device, a video device, a digital audio player (such as MP3 player), a camera, a game console, a tablet, a smart device, robots, drones, an industrial/manufacturing device, a wearable device (such as a smart watch, smart clothing, smart glasses, virtual reality goggles, a smart wristband, smart jewelry (such as a smart ring, a smart bracelet)), a vehicle/a vehicular device, a meter (such as parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (such as meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 4A:
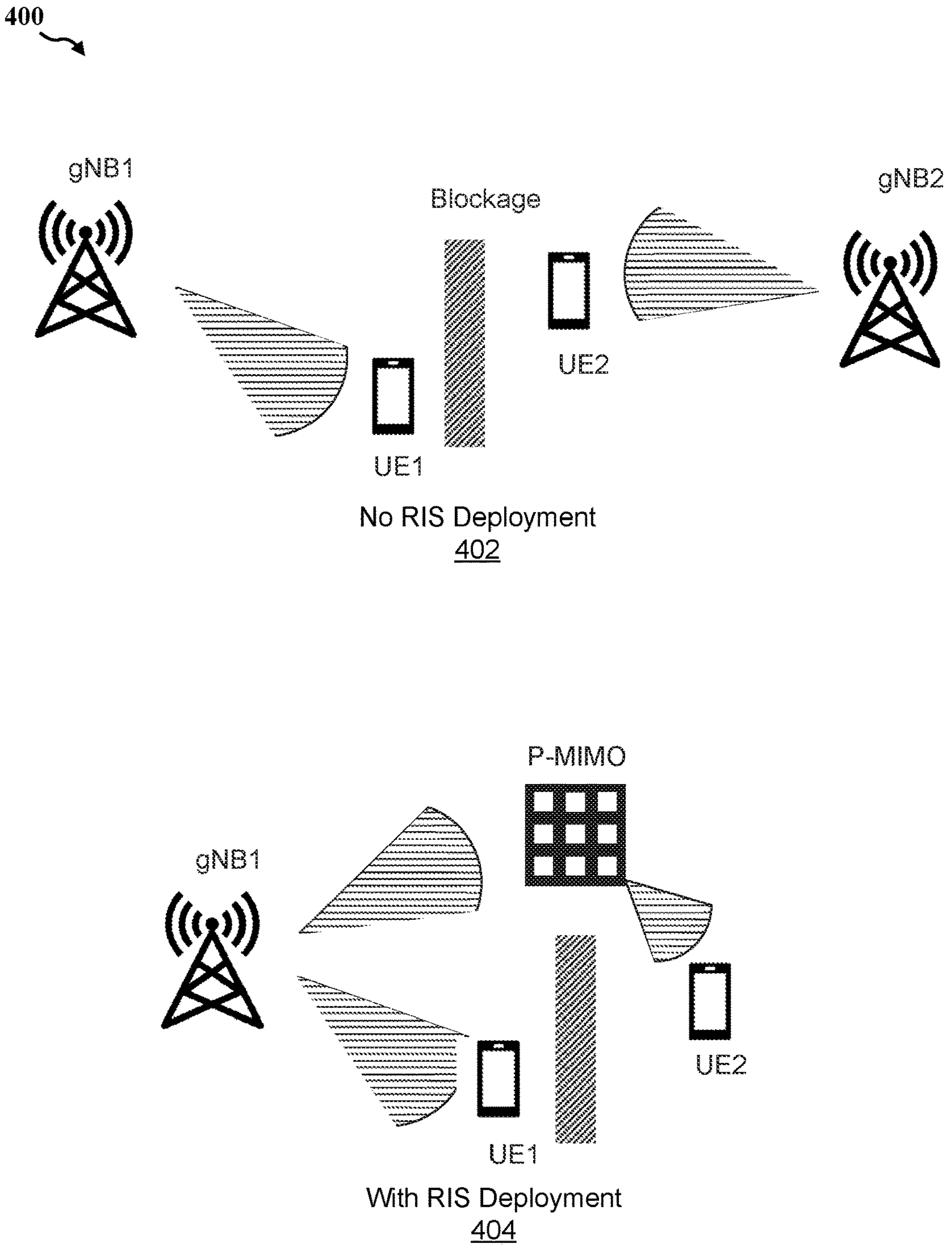
FIG. 4A is a diagram illustrating example communication scenarios with and without reconfigurable intelligent surface (RIS) deployment.
Figure 4B:
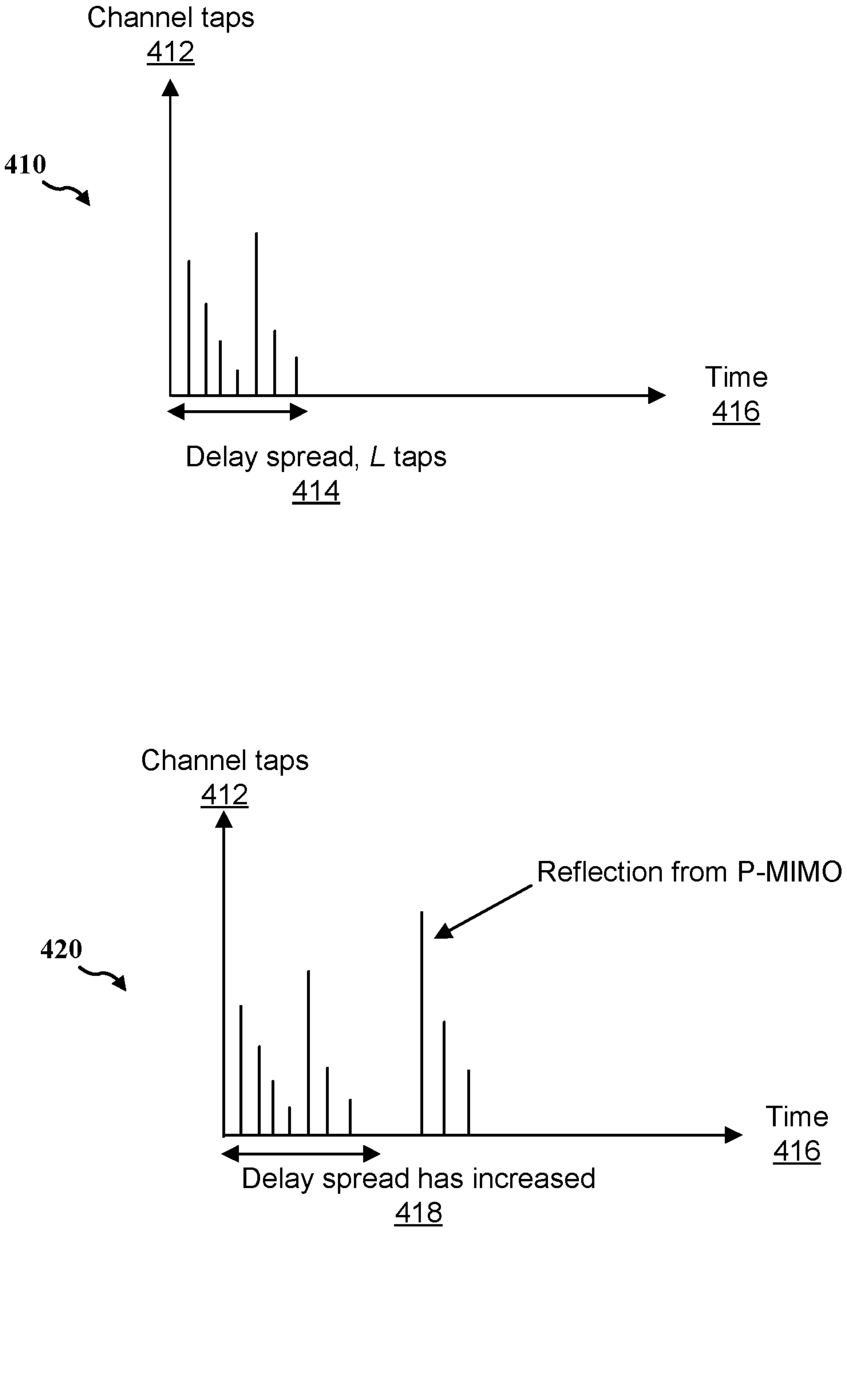
FIG. 4B shows a delay spread according to a graphing of channels taps over time.
Figure 4C:
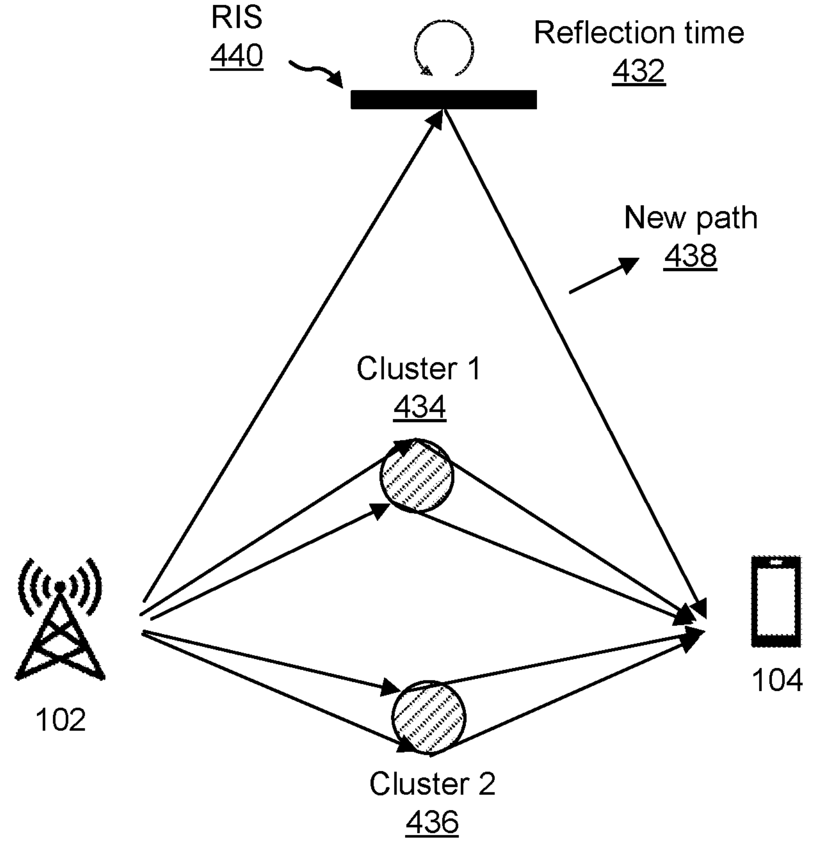
FIG. 4C illustrates an increase in the delay spread for a communication system employing RIS or passive multiple-input and multiple-output (P-MIMO).
Figure 4D:
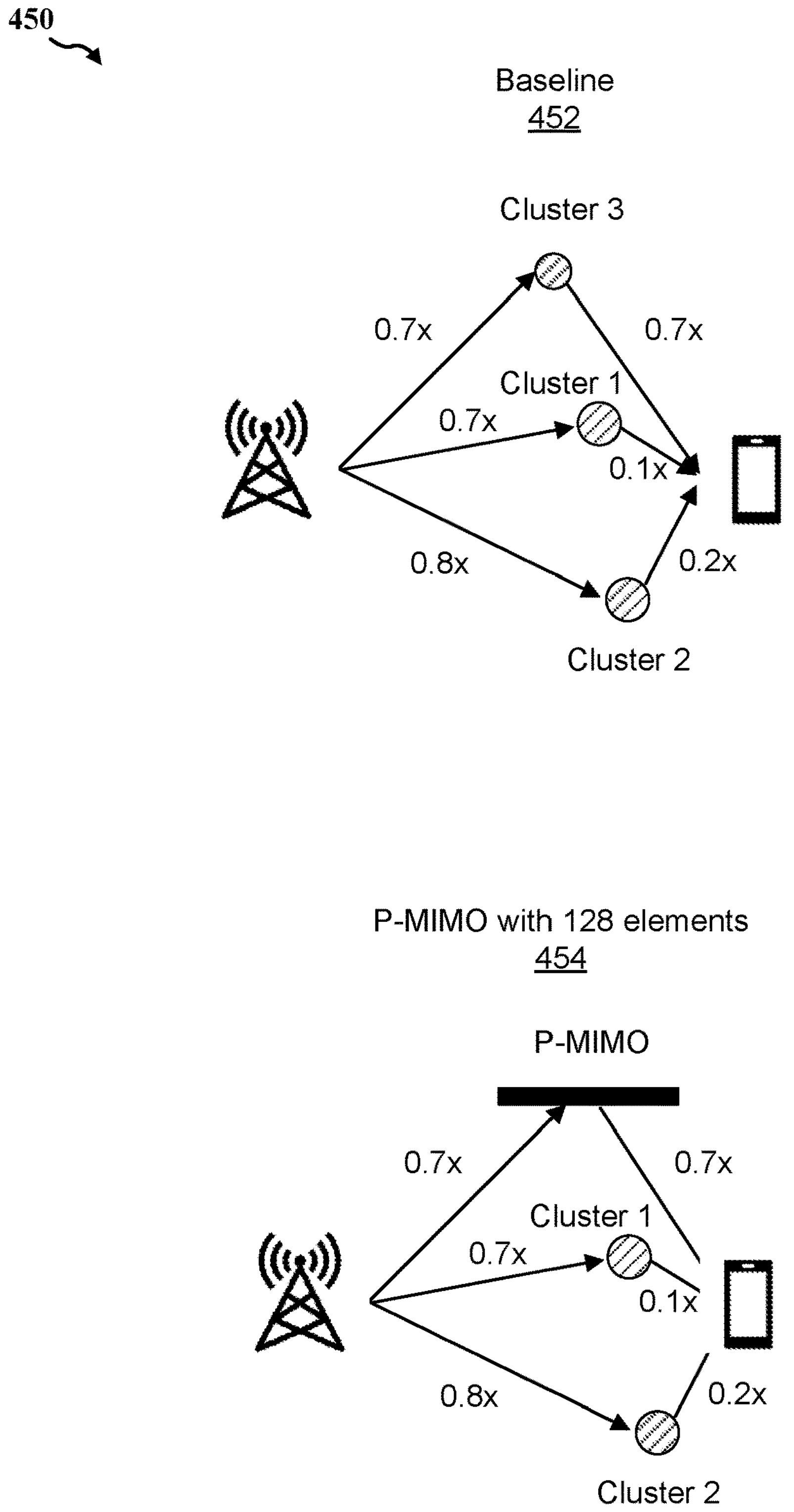
FIG. 4D illustrates an example of a multi-path communication scenario with and without RIS or P-MIMO.
Figure 5:
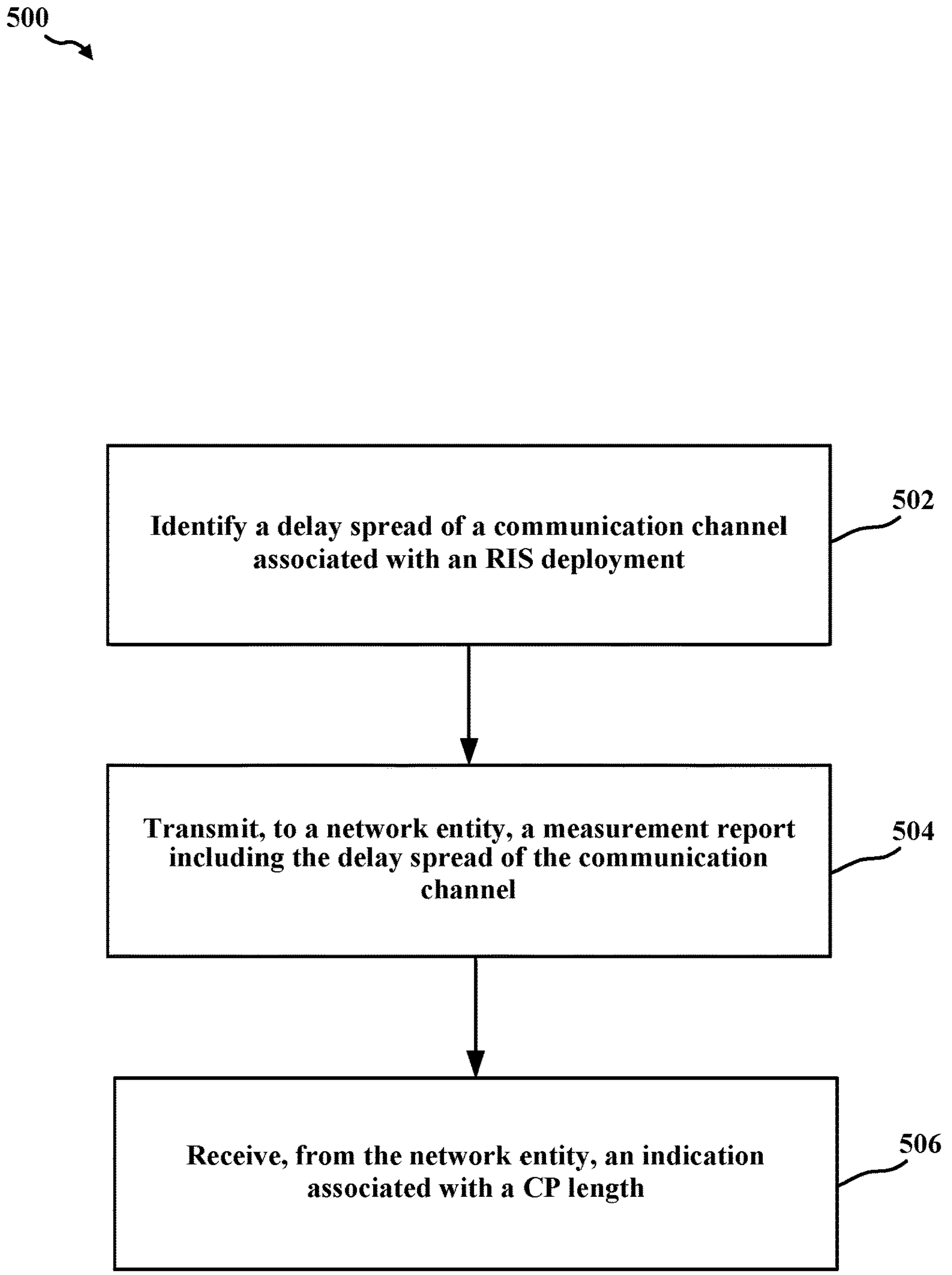
FIG. 5 is a flowchart of an example method of wireless communication at a UE.
Figure 6:
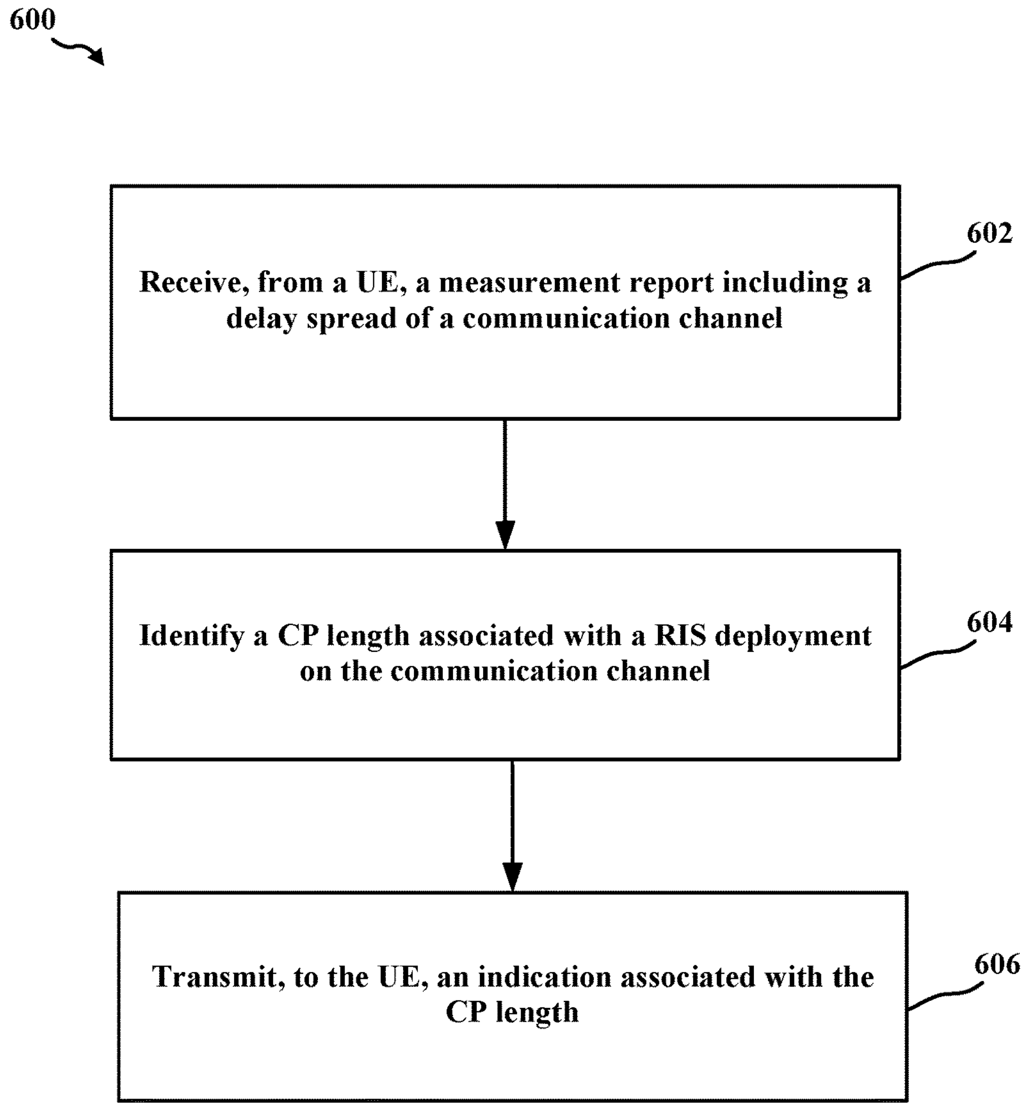
FIG. 6 is a flowchart of another example method of wireless communication at a network entity.

Turning now to FIGS. 2-7, aspects are depicted with reference to one or more components and one for more methods that may perform the actions or operations described herein, where aspects in dashed line may be optional. Although the operations described below in FIGS. 5 and 6 are presented in a particular order or as being performed by an example component, it should be understood that the ordering of the actions and the components performing the actions may be varied, depending on the implementation. Moreover, it should be understood that the following actions, functions, or described components may be performed by a specially-programmed processor, a processor executing specially-programmed software or computer-readable media, or by any other combination of a hardware component or a software component capable of performing the described actions or functions.

Figure 2:
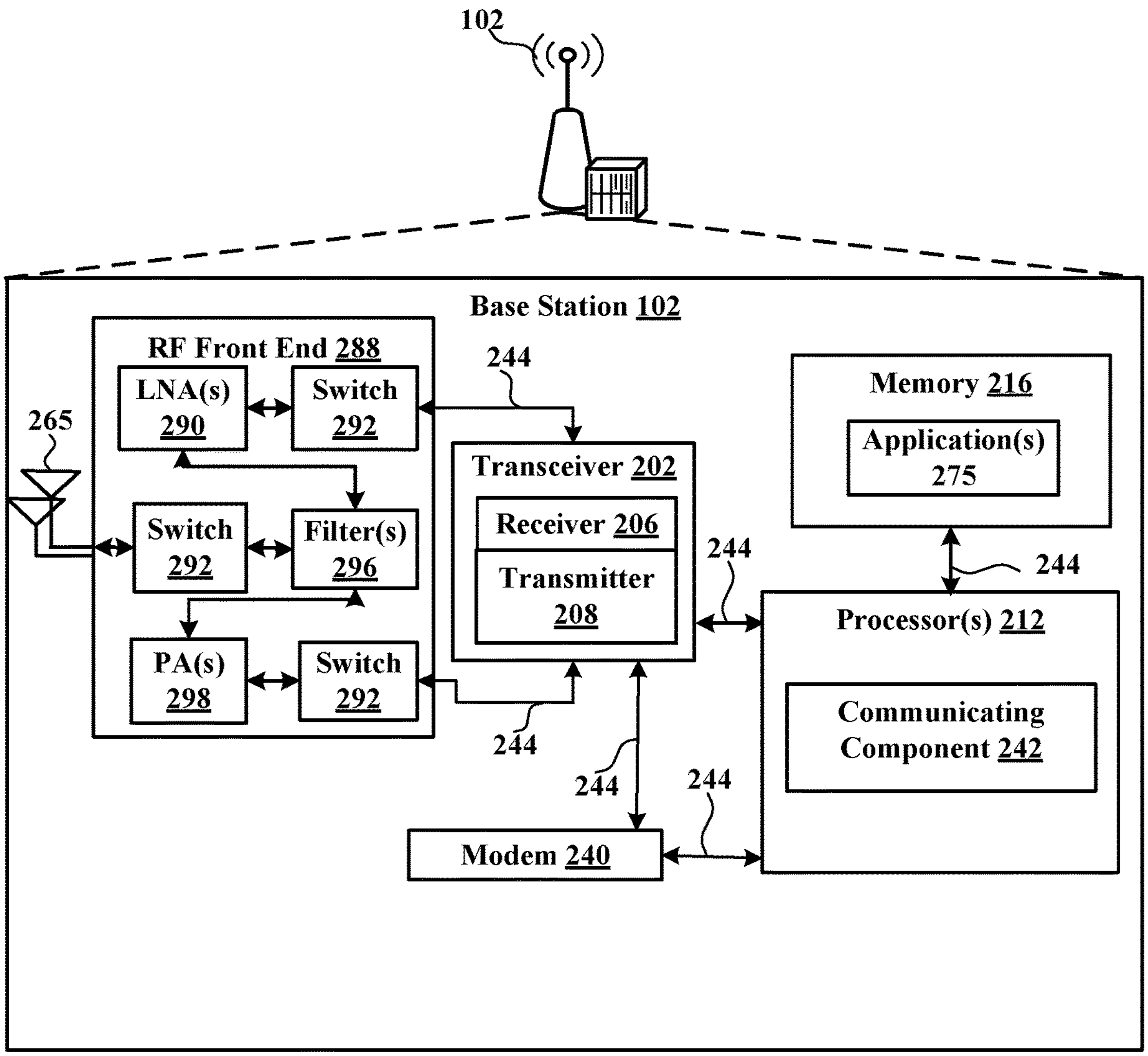
FIG. 2 is a block diagram illustrating an example of a network entity (also referred to as a base station).

FIG. 2 is a block diagram illustrating an example of a network entity (also referred to as a base station). The base station (such as a base station 102 or gNB 180, as described above) may include a variety of components, some of which have already been described above and are described further herein, including components such as one or more processors 212 and memory 216 and transceiver 202 in communication via one or more buses 244, which may operate in conjunction with modem 240 or communicating component 242 for CP adaptation for a RIS deployment.

In some aspects, the one or more processors 212 can include a modem 240 or can be part of the modem 240 that uses one or more modem processors. Thus, the various functions related to communicating component 242 may be included in modem 240 or processors 212 and, in some aspects, can be executed by a single processor, while in other aspects, different ones of the functions may be executed by a combination of two or more different processors. For example, in some aspects, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 or modem 240 associated with communicating component 242 may be performed by transceiver 202.

Also, memory 216 may be configured to store data used herein or local versions of applications 275 or communicating component 242 or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In some aspects, for example, memory 216 may be a non-transitory computer-readable storage medium that stores one or more computer-executable codes defining communicating component 242 or one or more of its subcomponents, or data associated therewith, when base station 102 is operating at least one processor 212 to execute communicating component 242 or one or more of its subcomponents.

Transceiver 202 may include at least one receiver 206 and at least one transmitter 208. Receiver 206 may include hardware or software executable by a processor for receiving data, the code including instructions and being stored in a memory (such as computer-readable medium). Receiver 206 may be, for example, a radio frequency (RF) receiver. In some aspects, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware or software executable by a processor for transmitting data, the code including instructions and being stored in a memory (such as computer-readable medium). A suitable example of transmitter 208 may including, but is not limited to, an RF transmitter.

Moreover, in some aspects, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, or antenna arrays.

In some aspects, LNA 290 can amplify a received signal at a desired output level. In some aspects, each LNA 290 may have a specified minimum and maximum gain values. In some aspects, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In some aspects, each PA 298 may have specified minimum and maximum gain values. In some aspects, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in some aspects, for example, a respective filter 296 can be used to filter an output from a respective PA 298 to produce an output signal for transmission. In some aspects, each filter 296 can be connected to a specific LNA 290 or PA 298. In some aspects, RF front end 288 can use one or more switches 292 to select a transmit or receive path using a specified filter 296, LNA 290, or PA 298, based on a configuration as specified by transceiver 202 or processor 212.

As such, transceiver 202 may be configured to transmit and receive wireless signals through one or more antennas 265 via RF front end 288. In some aspects, transceiver may be tuned to operate at specified frequencies such that UE 104 can communicate with, for example, one or more base stations 102 or one or more cells associated with one or more base stations 102. In some aspects, for example, modem 240 can configure transceiver 202 to operate at a specified frequency and power level based on the UE configuration of the UE 104 and the communication protocol used by modem 240.

In some aspects, modem 240 can be a multiband-multimode modem, which can process digital data and communicate with transceiver 202 such that the digital data is sent and received using transceiver 202. In some aspects, modem 240 can be multiband and be configured to support multiple frequency bands for a specific communications protocol. In some aspects, modem 240 can be multimode and be configured to support multiple operating networks and communications protocols. In some aspects, modem 240 can control one or more components of UE 104 (such as RF front end 288, transceiver 202) to enable transmission or reception of signals from the network based on a specified modem configuration. In some aspects, the modem configuration can be based on the mode of the modem and the frequency band in use. In another aspect, the modem configuration can be based on UE configuration information associated with UE 104 as provided by the network during cell selection or cell reselection.

In some aspects, the processor(s) 212 may correspond to one or more of the processors described in connection with the UE in FIGS. 4 and 6. Similarly, the memory 216 may correspond to the memory described in connection with the UE in FIG. 7.

Figure 3:
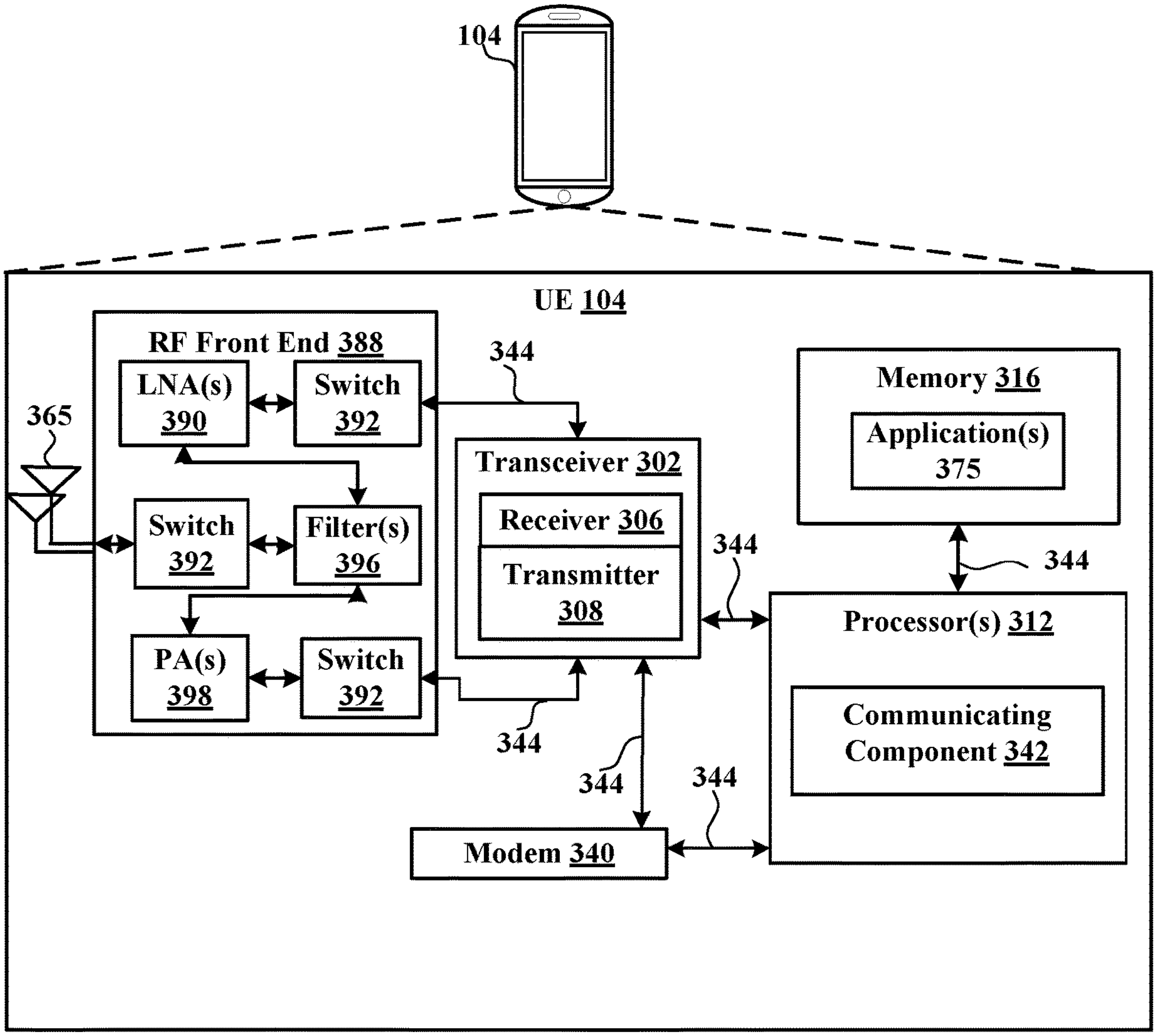
FIG. 3 is a block diagram illustrating an example of a user equipment (UE).

FIG. 3 is a block diagram illustrating an example of a UE 104. The UE 104 may include a variety of components, some of which have already been described above and are described further herein, including components such as one or more processors 312 and memory 316 and transceiver 302 in communication via one or more buses 344, which may operate in conjunction with modem 340 or communicating component 342 for transmitting, to base station 104, a sub-RB PUSCH based on a received configuration message indicating a symbol index, a PRB index and RE indexes within the PRB of sub-RB PUSCH, a DMRS frequency-domain comb pattern, a DMRS frequency shifting pattern and/or a transmit power per DMRS RE.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In some aspects, the processor(s) 312 may correspond to one or more of the processors described in connection with the base station in FIG. 7. Similarly, the memory 316 may correspond to the memory described in connection with the base station in FIG. 7.

FIG. 4A is a schematic diagram 400 illustrating example communication scenarios with and without RIS deployment. In one example of no RIS deployment 402, UE1 may be blocked from communicating with gNB2 or UE2, while UE2 may be blocked from communicating with gNB1 or UE1 due to a physical barrier preventing or attenuating wireless signals from traversing. In another example, of RIS deployment 404, a P-MIMO or RIS system may be deployed to facilitate communication between gNB1 and UE2. In some implementations, P-MIMO may be a substitute for an active antenna unit (AAU).

5G massive MIMO may be a key enabler for increasing throughput in a communication system. Further, high beamforming gain may be achieved by using AAUs. Individual RF chains per antenna ports may also be used as part of massive MIMO. However, a significant increase in power consumption may be experienced at a UE due to the use of AAUs.

RISs or P-MIMO may be employed to extend 5G coverage with negligible power consumption. For example, the devices may be considered as near passive, with the impinging wave reflected to a desired direction. In some implementations, reflection direction may be controlled by the gNB.

FIG. 4B shows a delay spread according to a graphing of channels taps over time. A first graph 410 includes a plot of channel taps 412 over time 416, with a delay spread 414 of L taps. A second graph 420 also includes a plot of channel taps 412 over time 416, but now with an increased delay spread 418 as a result of the reflection from P-MIMO or RIS deployment.

Both graphs may be associated with cyclic prefix orthogonal frequency division multiplexing (CP-OFDM). Specifically, multi-path propagation environment can cause intersymbol interference (ISI). For example, the state may be represented as:

$$y(n)=\sum_{m=0}^{L-1}x(n-m)h(m)\text{ for }n=0:N-1.$$

Adding a CP of length L or longer and discarding the CP at the receiver may eliminate ISI (i.e., L is the number of taps of the channel). In such scenario, the state may be represented as:

$$y(n)=\sum_{m=0}^{L-1}x((n-m)\%N)h(m)\text{ for }n=L:N-1.$$

In some implementations, cyclic convolution instead of linear convolution may permit point-wise multiplication in frequency-domain. Further, the CP length may be comparable to the delay spread of the channel.

FIG. 4C illustrates a conceptual diagram of a communication system 430 experiencing an increase in the delay spread employing RIS or P-MIMO. For example, the communication system 430 may include a base station 102, UE 104, a first cluster of network entities 434, and a second cluster of network entities 436. The communication system 430 may also include an RIS introducing a new path 438 from the base station 102 to the UE 104. However, with the new path 438 comes a corresponding reflection time 432, which may be associated with an increased delay spread.

P-MIMO, or RIS deployment, can increase the delay spread for several reasons. First, such implementation may introduce new paths to the multi-path propagation environment. The reflected power of these paths might be negligible in the absence of P-MIMO. Further, the beam may be reflected from multiple P-MIMO entities before arriving at the receiver such that each reflection may increase the delay. Moreover, P-MIMO may not immediately reflect the beam. Rather, there may be a non-negligible processing time for P-MIMO to apply the configured reflection matrix.

As the result, the delay spread may be larger when P-MIMO is used in gNB-UE communications than in cases without P-MIMO. Furthermore, the delay spread may depend on a relative position of the UE to P-MIMO. In some implementations, P-MIMO may not impact delay spread while in other implementations, P-MIMO may impact delay spread. The present implementations provide various options to manage the additional delay spread caused by P-MIMO.

FIG. 4D illustrates an example of a multi-path communication scenario 450 with and without RIS or P-MIMO. In a baseline 452 example, multiple clusters may facilitate communication between the base station and the UE. In some implementations, a cluster may corresponding to a building or any other object that is a model of the propagation environment between the gNB and the UE. The delay and pathloss for the various clusters in the baseline 452 example are represented in Table 1 below.

TABLE 1

| | Cluster 1 | Cluster 2 | Cluster 3 |
|---|---|---|---|
| Delay | $\frac{0.8x}{c}$ | $\frac{1.0x}{c}$ | $\frac{1.4x}{c}$ |
| Pathloss | $40\log_{10}0.26x =$ p(x) − 23.4 | $40\log_{10}0.4x =$ p(x) − 15.9 | $40\log_{10}0.7x =$ p(x) − 6.2 |

As shown in Table 1 above, the delay spread for clusters 1 and 2 may equal $$\frac{0.2x}{c}.$$

Further, a pathloss of 17.4 dB for cluster 3 may be worse than cluster 1, and can be ignored. In an implementation, a P-MIMO example 454 with 128 elements, the P-MIMO or RIS deployment may facilitate communication between the UE and base station. The delay and pathloss for the various clusters in the P-MIMO example 454 are represented in Table 2 below.

TABLE 2

| | Cluster 1 | Cluster 2 | P-MIMO |
|---|---|---|---|
| Delay | $\frac{0.8x}{c}$ | $\frac{1.0x}{c}$ | $\frac{1.4x}{c}$ |
| Pathloss | $40\log_{10}0.26x =$ p(x) − 23.4 | $40\log_{10}0.4x =$ p(x) − 15.9 | $40\log_{10}0.7x -$ 21 = p(x) − 27.2 |

As shown in Table 2 above, the delay spread for clusters 1 and 2 may equal $$\frac{0.6x}{c}.$$

Further, P-MIMO beamforming gain of $10 \log_{10} 128=21$ dB may be experienced by the P-MIMO entity.

The present implementations support flexible CP adaptation with an introduction of an extended CP. Furthermore, the choice of CP length may depend on whether P-MIMO is present in the communication between the gNB and UE. The duration of the CP to be used can be determined based on a number of techniques.

In an implementation, an extended CP duration may be supported across all numerologies or a subset of numerologies (e.g., ones with subcarrier spacing (SCS) larger than 30 kHz).

In another implementation, if a gNB indicates the presence of P-MIMO to the UE (e.g., based on measurement report from UE), the UE may use an extended CP length. Otherwise, the UE may use a normal cyclic prefix (NCP).

In a further implementation, the UE can measure the delay spread of the channel and report to the gNB. The gNB may set the CP length (e.g., NCP or ECP) based on the received report and indicate the CP length to the UE. Alternatively, the UE may select the CP length based on the measured delay spread, and inform the gNB, i.e., as part of a measurement report for P-MIMO presence determination. The forgoing may be useful for some scenarios where P-MIMO may not impact the delay spread while P-MIMO may impact delay spread in other scenarios.

In an additional implementation, multiple delay spreads can be reported for (i) P-MIMO is active (ii) P-MIMO is turned off.

In another implementation, the UE may report capability information including support for CP adaptation according to P-MIMO presence.

Flexible SCS switching may also help mitigate an increase in delay spread. For example, some SCSs may be associated with an NCP in frequency range (FR) 1/2 (i.e., except 60 kHz SCS). Generally, a lower SCS corresponds to a larger CP.

In one implementation, the choice of SCS (hence corresponding associated CP) can depend on whether P-MIMO is present in the communication between the gNB and UE (i.e., based on P-MIMO measurement report) or may depend on reported delay spread from UE.

In another implementation, if the gNB indicates the presence of P-MIMO to the UE (e.g., based on the measurement report from the UE), the UE can switch an SCS of a channel from a higher SCS to a lower SCS.

In a further implementation, the UE may report capability information of supporting the SCS switching feature.

FIG. 5 is a flowchart of an example method 500 of wireless communication at an apparatus of a UE. In an example, a UE 104 can perform the functions described in method 500 using one or more of the components described in FIGS. 1, 3 and 7.

At block 502, the method 500 may identify a delay spread of a communication channel associated with a RIS deployment. In some aspects, the communicating component 342, such as in conjunction with processor(s) 312, memory 316, or transceiver 302, may be configured to identify a delay spread of a communication channel associated with a RIS deployment. Thus, the UE 104, the processor(s) 312, the communicating component 342 or one of its subcomponents may define the means for identifying a delay spread of a communication channel associated with a RIS deployment.

In some implementations, identifying the delay spread may include identifying a plurality of delay spreads including the delay spread associated with an active RIS deployment or inactive RIS deployment.

At block 504, the method 500 may transmit, to a network entity, a measurement report including the delay spread of the communication channel. In some aspects, the communicating component 342, such as in conjunction with processor(s) 312, memory 316, or transceiver 302, may be configured to transmit, to a network entity, a measurement report including the delay spread of the communication channel. Thus, the UE 104, the processor(s) 312, the communicating component 342 or one of its subcomponents may define the means for transmitting, to a network entity, a measurement report including the delay spread of the communication channel.

At block 506, the method 500 may receive, from the network entity, an indication associated with a CP length. In some aspects, the communicating component 342, such as in conjunction with processor(s) 312, memory 316, or transceiver 302, may be configured to receive, from the network entity, an indication associated with a CP length. Thus, the UE 104, the processor(s) 312, the communicating component 342 or one of its subcomponents may define the means for receiving, from the network entity, an indication associated with a CP length.

In some implementations, the indication may signify a presence of the RIS deployment, and the method 500 may further select an extended CP length to mitigate ISI on the communication channel. In some aspects, the communicating component 342, such as in conjunction with processor(s) 312, memory 316, or transceiver 302, may be configured to select an extended CP length to mitigate ISI on the communication channel. Thus, the UE 104, the processor(s) 312, the communicating component 342 or one of its subcomponents may define the means for selecting an extended CP length to mitigate ISI on the communication channel.

In some implementations, the indication signifies an absence of the RIS deployment, and the method 500 may further select a normal CP for transmissions on the communication channel. In some aspects, the communicating component 342, such as in conjunction with processor(s) 312, memory 316, or transceiver 302, may be configured to select a normal CP for transmissions on the communication channel. Thus, the UE 104, the processor(s) 312, the communicating component 342 or one of its subcomponents may define the means for selecting a normal CP for transmissions on the communication channel.

In some implementations, the CP length may correspond to one of an extended CP length or a normal CP length, and where receiving the indication may include receiving, from the network entity, the indication including one of the extended CP length or the normal CP length.

Although not shown, the method 500 may further include selecting the CP length as one of an extended CP length or a normal CP length based on the delay spread. In some aspects, the communicating component 342, such as in conjunction with processor(s) 312, memory 316, or transceiver 302, may be configured to select the CP length as one of an extended CP length or a normal CP length based on the delay spread. Thus, the UE 104, the processor(s) 312, the communicating component 342 or one of its subcomponents may define the means for selecting the CP length as one of an extended CP length or a normal CP length based on the delay spread.

In some implementations, transmitting, to the network entity, the measurement report may include transmitting the selected CP length.

In some implementations, the CP length may be a function of the delay spread of the communication channel.

Although not shown, the method 500 may further include transmitting UE capability of CP adaptation according to the RIS deployment. In some aspects, the communicating component 342, such as in conjunction with processor(s) 312, memory 316, or transceiver 302, may be configured to transmit UE capability of CP adaptation according to the RIS deployment. Thus, the UE 104, the processor(s) 312, the communicating component 342 or one of its subcomponents may define the means for transmitting UE capability of CP adaptation according to the RIS deployment.

In some implementations, the CP length may correspond to an extended CP length across all numerologies or a subset of numerologies.

In some implementations, although not shown, the method 500 may further include selecting a SCS based on the RIS deployment or the delay spread of the communication channel. In some aspects, the communicating component 342, such as in conjunction with processor(s) 312, memory 316, or transceiver 302, may be configured to select a SCS based on the RIS deployment or the delay spread of the communication channel. Thus, the UE 104, the processor(s) 312, the communicating component 342 or one of its subcomponents may define the means for selecting a SCS based on the RIS deployment or the delay spread of the communication channel.

In some implementations, the SCS and the CP length may be inversely proportional.

In some implementations, the indication signifies a presence of the RIS deployment, and the method 500 may further include switching from a first SCS to a second SCS lower than the first SCS. In some aspects, the communicating component 342, such as in conjunction with processor(s) 312, memory 316, or transceiver 302, may be configured to switch from a first SCS to a second SCS lower than the first SCS. Thus, the UE 104, the processor(s) 312, the communicating component 342 or one of its subcomponents may define the means for switching from a first SCS to a second SCS lower than the first SCS.

Although not shown, the method 500 may further include transmitting a message indicating support for SCS switching based on the RIS deployment or the delay spread of the communication channel. In some aspects, the communicating component 342, such as in conjunction with processor(s) 312, memory 316, or transceiver 302, may be configured to transmit a message indicating support for SCS switching based on the RIS deployment or the delay spread of the communication channel. Thus, the UE 104, the processor(s) 312, the communicating component 342 or one of its subcomponents may define the means for transmitting a message indicating support for SCS switching based on the RIS deployment or the delay spread of the communication channel.

FIG. 6 is a flowchart of another example method 600 for wireless communication at an apparatus of a network entity. In an example, a base station 102 can perform the functions described in method 600 using one or more of the components described in FIGS. 1,2 and 7.

At block 602, the method 600 may receive, from a user equipment (UE), a measurement report including a delay spread of a communication channel. In some aspects, the communicating component 242, such as in conjunction with processor(s) 212, memory 216, or transceiver 202, may be configured to receive, from a user equipment (UE), a measurement report including a delay spread of a communication channel. Thus, the base station 102, the processor(s) 212, the communicating component 242 or one of its subcomponents may define the means for receiving, from a user equipment (UE), a measurement report including a delay spread of a communication channel.

In some implementations, receiving the measurement report may include identifying a plurality of delay spreads including the delay spread associated with an active RIS deployment or inactive RIS deployment.

At block 604, the method 600 may identify a CP length associated with a RIS deployment on the communication channel. In some aspects, the communicating component 242, such as in conjunction with processor(s) 212, memory 216, or transceiver 202, may be configured to identify a CP length associated with a RIS deployment on the communication channel. Thus, the base station 102, the processor(s) 212, the communicating component 242 or one of its subcomponents may define the means for identifying a CP length associated with a RIS deployment on the communication channel.

In some implementations, the CP length may correspond to one of an extended CP length or a normal CP length, and where receiving the indication may include receiving, from the network entity, the indication including one of the extended CP length or the normal CP length.

In some implementations, the CP length may be a function of the delay spread of the communication channel.

In some implementations, the CP length may correspond to an extended CP length across all numerologies or a subset of numerologies.

At block 606, the method 600 may transmit, to the UE, an indication associated with the CP length. In some aspects, the communicating component 242, such as in conjunction with processor(s) 212, memory 216, or transceiver 202, may be configured to transmit, to the UE, an indication associated with the CP length. Thus, the base station 102, the processor(s) 212, the communicating component 242 or one of its subcomponents may define the means for transmitting, to the UE, an indication associated with the CP length.

In some implementations, the indication may signify a presence of the RIS deployment or an absence of the RIS deployment.

Although not shown, the method 600 may further include receiving, from the UE, a message including a CP length selected by the UE. In some aspects, the communicating component 242, such as in conjunction with processor(s) 212, memory 216, or transceiver 202, may be configured to receive, from the UE, a message including a CP length selected by the UE. Thus, the base station 102, the processor(s) 212, the communicating component 242 or one of its subcomponents may define the means for receiving, from the UE, a message including a CP length selected by the UE.

Although not shown, the method 600 may further include receiving UE capability of a CP adaptation according to the RIS deployment. In some aspects, the communicating component 242, such as in conjunction with processor(s) 212, memory 216, or transceiver 202, may be configured to receive UE capability of a CP adaptation according to the RIS deployment. Thus, the base station 102, the processor(s) 212, the communicating component 242 or one of its subcomponents may define the means for receiving UE capability of a CP adaptation according to the RIS deployment.

Although not shown, the method 600 may further include receiving, from the UE, a message indicating support for SCS switching based on the RIS deployment or the delay spread of the communication channel. In some aspects, the communicating component 242, such as in conjunction with processor(s) 212, memory 216, or transceiver 202, may be configured to receive, from the UE, a message indicating support for SCS switching based on the RIS deployment or the delay spread of the communication channel. Thus, the base station 102, the processor(s) 212, the communicating component 242 or one of its subcomponents may define the means for receiving, from the UE, a message indicating support for SCS switching based on the RIS deployment or the delay spread of the communication channel.

Figure 7:
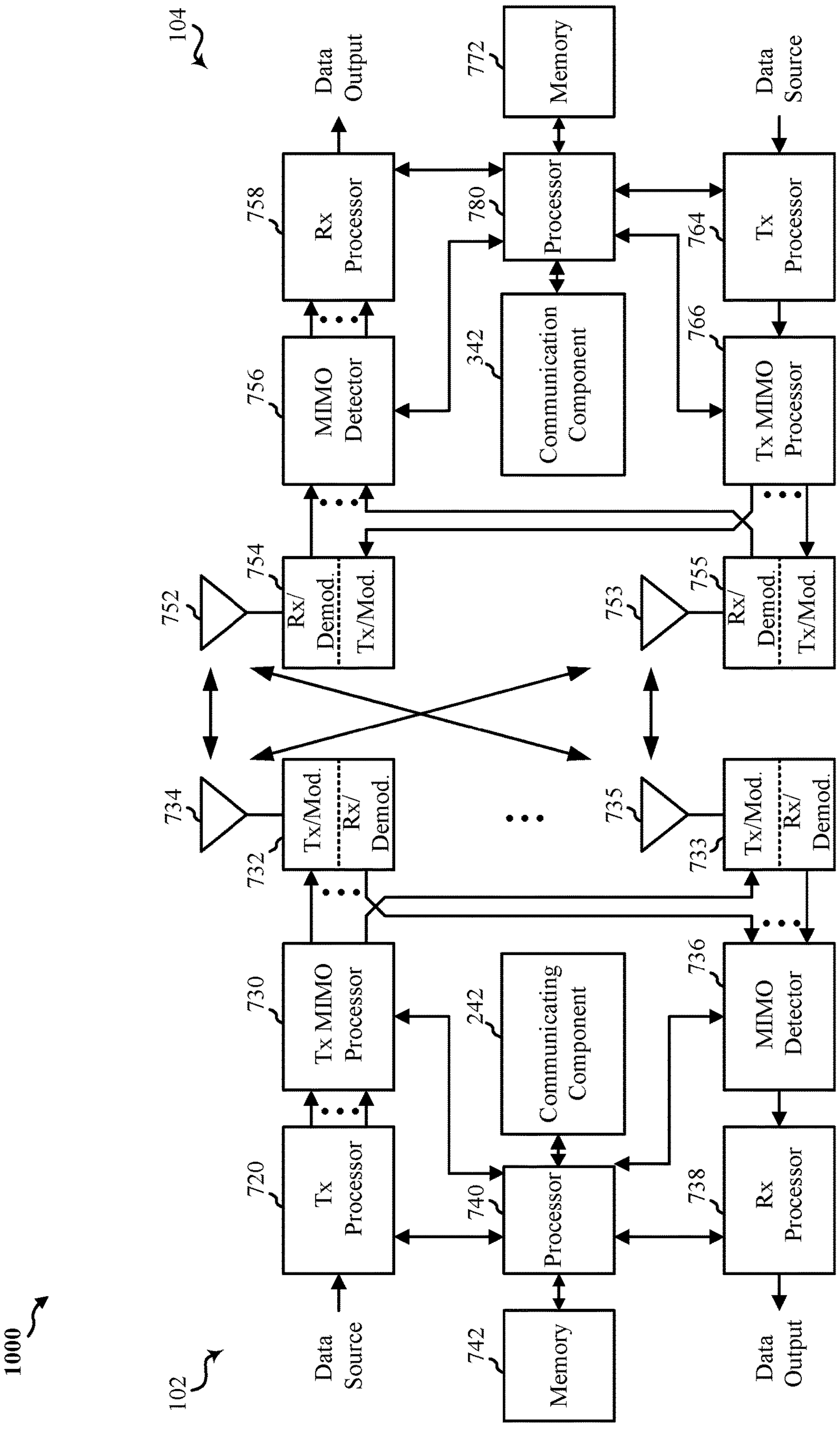
FIG. 7 is a block diagram illustrating an example of a MIMO communication system including a base station and a UE.

FIG. 7 is a block diagram of a MIMO communication system 700 including a base station 102 and a UE 104. The MIMO communication system 700 may be configured to implement the CP adaptation based on the delay spread and presence of RIS deployment techniques described herein. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 also may generate control symbols or reference symbols. A transmit MIMO processor 730 may perform spatial processing (such as precoding) on data symbols, control symbols, or reference symbols, if applicable, and may provide output symbol streams to the transmit modulator/demodulators 732 and 733. Each modulator/demodulator 732 through 733 may process a respective output symbol stream (such as for OFDM, etc.) to obtain an output sample stream. Each modulator/demodulator 732 through 733 may further process (such as convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (such as filter, amplify, downconvert, and digitize) a respective received signal to obtain input samples. Each modulator/demodulator 754 through 755 may further process the input samples (such as for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (such as demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see such as FIGS. 1 and 2).

On the uplink (UL), at the UE 104, a transmit processor 764 may receive and process data from a data source. The transmit processor 764 also may generate reference symbols for a reference signal. The symbols from the transmit processor 764 may be precoded by a transmit MIMO processor 766 if applicable, further processed by the modulator/demodulators 754 and 755 (such as for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

An Appendix is included that is part of the present application and provides additional details related to the various aspects of the present disclosure.

Some Additional Examples

The aspects described herein additionally include one or more of the following aspect examples described in the following numbered clauses.

1. A method of communication at a user equipment (UE), comprising:
   identifying a delay spread of a communication channel associated with a reconfigurable intelligent surface (RIS) deployment;
   transmitting, to a network entity, a measurement report including the delay spread of the communication channel; and
   receiving, from the network entity, an indication associated with a cyclic prefix (CP) length.
2. The method of clause 1, where the indication signifies a presence of the RIS deployment, the method further comprising:
   selecting an extended CP length to mitigate inter-symbol interference (ISI) on the communication channel.
3. The method of any preceding clause, where the indication signifies an absence of the RIS deployment, the method further comprising:
   selecting a normal CP for transmissions on the communication channel.

4. The method of any preceding clause, where the CP length corresponds to one of an extended CP length or a normal CP length, and where receiving the indication includes receiving, from the network entity, the indication including one of the extended CP length or the normal CP length.
5. The method of any preceding clause, further comprising selecting the CP length as one of an extended CP length or a normal CP length based on the delay spread, and where
transmitting, to the network entity, the measurement report includes transmitting the selected CP length.
6. The method of any preceding clause, where the CP length is a function of the delay spread of the communication channel.
7. The method of any preceding clause, where identifying the delay spread includes identifying a plurality of delay spreads including the delay spread associated with an active RIS deployment or inactive RIS deployment.
8. The method of preceding clause, further comprising transmitting UE capability of CP adaptation according to the RIS deployment.
9. The method of preceding clause, where the CP length corresponds to an extended CP length across all numerologies or a subset of numerologies.
10. The method of preceding clause, further comprising selecting a subcarrier spacing (SCS) based on the RIS deployment or the delay spread of the communication channel, where the SCS and the CP length are inversely proportional.
11. The method of preceding clause, where the indication signifies a presence of the RIS deployment, the method further comprising:
switching from a first subcarrier spacing (SCS) to a second SCS lower than the first SCS.
12. The method of preceding clause, further comprising transmitting a message indicating support for subcarrier switching (SCS) switching based on the RIS deployment or the delay spread of the communication channel.
13. A method of communication at a network entity, comprising:
receiving, from a user equipment (UE), a measurement report including a delay spread of a communication channel;
identifying a cyclic prefix (CP) length associated with a reconfigurable intelligent surface (RIS) deployment on the communication channel; and
transmitting, to the UE, an indication associated with the CP length.
14. The method of clause 13, where the indication signifies a presence of the RIS deployment or an absence of the RIS deployment.
15. The method of preceding clause, where the CP length corresponds to one of an extended CP length or a normal CP length, and where receiving the indication includes receiving, from the network entity, the indication including one of the extended CP length or the normal CP length.
16. The method of preceding clause, further comprising receiving, from the UE, a message including a CP length selected by the UE.
17. The method of preceding clause, where the CP length is a function of the delay spread of the communication channel.
18. The method of preceding clause, where receiving the measurement report further includes identifying a plurality of delay spreads including the delay spread associated with an active RIS deployment or inactive RIS deployment.
19. The method of preceding clause, further comprising receiving UE capability of a CP adaptation according to the RIS deployment.
20. The method of preceding clause, where the CP length corresponds to an extended CP length across all numerologies or a subset of numerologies.
21. The method of preceding clause, further comprising receiving, from the UE, a message indicating support for subcarrier switching (SCS) switching based on the RIS deployment or the delay spread of the communication channel.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks, usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of communication at a user equipment (UE), comprising:
- identifying a delay spread of a communication channel associated with a reconfigurable intelligent surface (RIS) deployment;
- transmitting, to a network entity, a measurement report including the delay spread of the communication channel; and
- receiving, from the network entity, an indication associated with the RIS deployment,
- wherein in response to the indication signifying a presence of the RIS deployment, the method further comprises:
  - selecting an extended cyclic prefix (CP) length to mitigate inter-symbol interference (ISI) on the communication channel; or
- wherein in response to the indication signifying an absence of the RIS deployment, the method further comprises:
  - selecting a normal CP for transmissions on the communication channel.

2. The method of claim 1, wherein the CP length corresponds to one of an extended CP length or a normal CP length, wherein the extended CP length is across all numerologies or a subset of numerologies, and wherein receiving the indication includes receiving, from the network entity, the indication including one of the extended CP length or the normal CP length.

3. The method of claim 1,
- wherein transmitting, to the network entity, the measurement report includes transmitting the selected CP length.

4. The method of claim 1, wherein identifying the delay spread includes identifying a plurality of delay spreads including the delay spread associated with an active RIS deployment or inactive RIS deployment.

5. The method of claim 1, further comprising at least one of:
- transmitting UE capability of CP adaptation according to the RIS deployment; or
- selecting a subcarrier spacing (SCS) based on the RIS deployment or the delay spread of the communication channel, wherein the SCS and the CP length are inversely proportional.

6. The method of claim 1, wherein the indication signifies a presence of the RIS deployment, the method further comprising:
- switching from a first subcarrier spacing (SCS) to a second SCS lower than the first SCS.

7. The method of claim 1, further comprising transmitting a message indicating support for subcarrier switching (SCS) switching based on the RIS deployment or the delay spread of the communication channel.

8. A method of communication at a network entity, comprising:
- receiving, from a user equipment (UE), a measurement report including a delay spread of a communication channel associated with a reconfigurable intelligent surface (RIS) deployment;
- identifying a cyclic prefix (CP) length associated with a reconfigurable intelligent surface (RIS) deployment on the communication channel; and transmitting, to the UE, an indication associated with the RIS deployment and that signifies a presence or an absence of the RIS deployment.

9. The method of claim 8, wherein the CP length corresponds to one of an extended CP length or a normal CP length, wherein the extended CP length is across all numerologies or a subset of numerologies, and wherein transmitting the indication includes transmitting the indication including one of the extended CP length or the normal CP length.

10. The method of claim 8, further comprising:

receiving, from the UE, a message including a CP length selected by the UE, wherein the CP length is a function of the delay spread of the communication channel.

11. The method of claim 8, wherein receiving the measurement report further includes identifying a plurality of delay spreads including the delay spread associated with an active RIS deployment or inactive RIS deployment.

12. The method of claim 8, further comprising at least one of:

receiving UE capability of a CP adaptation according to the RIS deployment; or receiving, from the UE, a message indicating support for subcarrier switching (SCS) switching based on the RIS deployment or the delay spread of the communication channel.

13. An apparatus at a user equipment (UE) for wireless communication, comprising:

a transceiver;

one or more memories configured to store instructions; and one or more processors communicatively coupled with the transceiver and the one or more memories, wherein the one or more processors are configured, individually or in combination, to:

identify a delay spread of a communication channel associated with a reconfigurable intelligent surface (RIS) deployment;

transmit, to a network entity, a measurement report including the delay spread of the communication channel; and receive, from the network entity, an indication associated with the RIS deployment, wherein in response to a presence of the RIS deployment, the one or more processors are further configured to:

select an extended cyclic prefix (CP) length to mitigate inter-symbol interference (ISI) on the communication channel; or wherein in response to the indication signifying an absence of the RIS deployment, the one or more processors are further configured to:

select a normal CP for transmissions on the communication channel.

14. The apparatus of claim 13, wherein the CP length corresponds to one of an extended CP length or a normal CP length, wherein the extended CP length is across all numerologies or a subset of numerologies, and wherein the indication includes one of the extended CP length or the normal CP length.

15. The apparatus of claim 13, wherein the measurement report includes the selected CP length.

16. The apparatus of claim 13, wherein, to identify the delay spread, the one or more processors are configured to identify a plurality of delay spreads including the delay spread associated with an active RIS deployment or inactive RIS deployment.

17. The apparatus of claim 13, wherein the one or more processors are further configured to:

transmit UE capability of CP adaptation according to the RIS deployment; and/or select a subcarrier spacing (SCS) based on the RIS deployment or the delay spread of the communication channel, wherein the SCS and the CP length are inversely proportional.

18. The apparatus of claim 13, wherein the indication signifies a presence of the RIS deployment, and wherein the one or more processors are further configured to:

switch from a first subcarrier spacing (SCS) to a second SCS lower than the first SCS.

19. The apparatus of claim 13, wherein the one or more processors are further configured to:

transmit a message indicating support for subcarrier switching (SCS) switching based on the RIS deployment or the delay spread of the communication channel.

20. An apparatus at a network entity for wireless communication, comprising:

a transceiver;

one or more memories configured to store instructions; and one or more processors communicatively coupled with the transceiver and the one or more memories, wherein the one or more processors are configured, individually or in combination, to:

receive, from a user equipment (UE), a measurement report including a delay spread of a communication channel associated with a reconfigurable intelligent surface (RIS) deployment;

identify a cyclic prefix (CP) length associated with a reconfigurable intelligent surface (RIS) deployment on the communication channel; and transmit, to the UE, an indication associated with the RIS deployment and that signifies a presence or an absence of the RIS deployment.

21. The apparatus of claim 20, wherein the CP length corresponds to one of an extended CP length or a normal CP length, wherein the extended CP length is across all numerologies or a subset of numerologies, and wherein the one or more processors are configured to transmit the indication including one of the extended CP length or the normal CP length.

22. The apparatus of claim 20, wherein the one or more processors are further configured to receive, from the UE, a message including the CP length selected by the UE, wherein the CP length is a function of the delay spread of the communication channel.

23. The apparatus of claim 20, wherein based on receiving the measurement report, the one or more processors are further configured to identify a plurality of delay spreads including the delay spread associated with an active RIS deployment or inactive RIS deployment.

24. The apparatus of claim 20, wherein the one or more processors are further configured to:

receive a UE capability of a CP adaptation according to the RIS deployment; and/or receive, from the UE, a message indicating support for subcarrier switching (SCS) switching based on the RIS deployment or the delay spread of the communication channel.

* * * * *